(12) United States Patent
Feller (10) Patent No.: US 7,270,015 B1
(45) Date of Patent: Sep. 18, 2007

(54) THERMAL PULSED ULTRASONIC FLOW SENSOR

(76) Inventor: Murray F Feller, Micanopy Measurement & Control 21577 NW. 75th Ave. Rd., Micanopy, FL (US) 32667

( * ) Notice: Subject to any disclaimer, the term of this patent is extended or adjusted under 35 U.S.C. 154(b) by 0 days.

(21) Appl. No.: 11/564,663

(22) Filed: Nov. 29, 2006

(51) Int. Cl.
*G01F 1/708* (2006.01)
(52) U.S. Cl. .................... 73/861.95; 600/547
(58) Field of Classification Search ........... 600/547; 702/29; 73/861.95
See application file for complete search history.

(56) References Cited

U.S. PATENT DOCUMENTS

| | | | |
|---|---|---|---|
| 4,480,483 A | | 11/1984 | McShane |
| 5,146,414 A | * | 9/1992 | McKown et al. ............. 702/49 |
| 5,954,659 A | * | 9/1999 | Curley et al. ............... 600/505 |
| 6,299,583 B1 | * | 10/2001 | Eggers et al. .............. 600/526 |
| 6,926,838 B2 | | 8/2005 | Krivitski et al. |
| 7,112,176 B2 | | 9/2006 | Krivitski et al. |
| 2004/0230131 A1 | * | 11/2004 | Kassab et al. ............. 600/547 |

* cited by examiner

*Primary Examiner*—Jewel Thompson
(74) *Attorney, Agent, or Firm*—David Kiewit (57) ABSTRACT

In thermal pulse flow measurements a relatively small bolus of flowing fluid is heated or cooled and the time required for the bolus to move downstream a known distance is measured. In many fluids, changing the temperature changes the acoustic transmission properties of the bolus from those of the rest of the fluid, so the bolus can be detected when it intersects an acoustic beam. The use of an acoustic beam or beams, which are usually defined between acoustic transmitting receiving transducers, typically provides a high frequency carrier which is modulated by the change in acoustic properties of the bolus when it passes between the two transducers. When compared to conventional thermal measurements, this acoustic approach provides faster response times and can thus be used for measuring higher flow rates.

20 Claims, 5 Drawing Sheets

THERMAL PULSED ULTRASONIC FLOW SENSOR

BACKGROUND OF THE INVENTION

The present invention relates generally to apparatus and methods for measuring the flow rate of a fluid and is applicable to probe and in-line apparatus for making such measurements. More specifically, the invention relates to thermal pulse flow measurements in which a relatively small bolus of flowing fluid is heated or cooled and the time required for the bolus to move downstream a known distance is measured.

Prior art thermal pulsed flow meters typically produce a heat pulse by placing an electric resistance heater in the flowing fluid. This raises the temperature of a small amount of the fluid that is then detected downstream by one or more temperature sensors. By measuring the time interval between the thermal pulse and the detected temperature increase, the fluid flow rate can be determined. The relatively long time required for temperature sensors to respond to the fluid temperature rise relegates this method to measurement of low fluid flow rates. In addition, the temperature sensor elements used are usually constrained to be relatively small and fragile in order to reduce response time. These are often not suitable for direct exposure to fluids in general purpose flow measurement applications.

BRIEF SUMMARY OF THE INVENTION

The present invention provides apparatus and methods for measuring the flow rate of a fluid. This involves rapidly changing the temperature of a portion of the fluid, hereinafter referred to as a bolus. Changing the temperature changes the acoustic transmission properties of the bolus from those of the rest of the fluid so that the bolus can be detected by ultrasonic means a known distance downstream of the point at which the thermal pulse is supplied.

This invention is generally applicable to measuring the flow of fluids characterized by having acoustic properties that change with temperature. The acoustic properties of interest comprise at least the speed of sound in the fluid and the acoustic index of refraction of the fluid. Water and aqueous solutions are of particular commercial interest. The speed of sound in these liquids increases with temperature. In water, for example, the speed of sound increases from about 1400 meters per second at zero degrees Celsius to about 1550 meters per second at seventy four degrees Celsius. Many non-aqueous solutions that are of commercial interest are characterized by a speed of sound that decreases with temperature. The method and apparatus of the invention can be adapted to function regardless of whether the speed of sound increases or decreases with temperature, as long as the magnitude of the change is adequate.

An acoustic beam, which may be defined between an acoustic transmitting transducer and a receiving transducer, typically provides a high frequency carrier which is modulated by the change in acoustic properties of the bolus when it pass between the two transducers. The carrier frequency is selected to be relatively high compared to that of the rate of modulation so that the effects of the modulation are responded to very quickly. Relatively short time intervals between the heating and detection of the heated fluid, corresponding to high fluid flow rates, can be accommodated. Furthermore, the transducer elements are typically located behind environmentally protective windows which provide desired ruggedness.

One preferred embodiment of the invention uses an electrically pulsed heater upstream from an acoustic transmitter and receiver pair that communicate with each other along a path transverse to the flow direction. The change in acoustic transmission properties of the bolus heated by the thermal pulse passing between the acoustic transmitter and receiver enables the bolus to be detected. The time interval between the heater pulse and acoustically detected pulse is measured to determine fluid flow rate.

In another embodiment, a single ultrasonic transducer and a reflector, which may be a portion of a flow channel, are used to define an acoustic beam through which the heated bolus is carried by the flowing fluid.

In yet another preferred embodiment of the invention having two receiving transducers arranged side by side along the path of fluid flow, both receiving elements are preferably equally exposed to acoustic transmissions from a single transmitting transducer and used to differentially detect the passage of the bolus. This detection method is more sensitive to the effects of small acoustic differences and more tolerant of environmental variations which may otherwise produce flow rate measurement error.

Because a portion of the flowing fluid is heated by the flow meter, the power requirements for operating such a meter can limit its practical size if it is to sense flow rate across the entire cross section of the flow passage. For larger pipe sizes a sampling method is employed and the total flow rate is calculated from the cross sectional area of the pipe and a flow rate measurement at one or more locations within that area. Because the present invention enables flow rate measurements to be made with relatively short distances between the heated and detecting elements of the sensor it is compatible with an insertion probe configuration in which the probe is inserted through a small openings in a large pipe. This has generally not been possible with prior art thermal pulsed flow sensing techniques. Moreover, the use of bypass flow loops and flow-confining vanes can extend the maximum size of a channel in which flow can be measured.

Although it is believed that the foregoing description may be of use to one who is skilled in the art and wishes to learn how to practice the invention, it will be recognized that the foregoing recital is not intended to list all the embodiments, features and advantages. Those skilled in the art will appreciate that they may readily use both the underlying ideas and the specific embodiments disclosed in the Detailed Description as a basis for designing arrangements to achieve the same purposes of the present invention and that such equivalent constructions are within the spirit and scope of the invention in its broadest form. Moreover, it may be noted that different embodiments of the invention may provide various combinations of the recited features and advantages of the invention and that less than all of the recited features and advantages may be provided by some embodiments.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
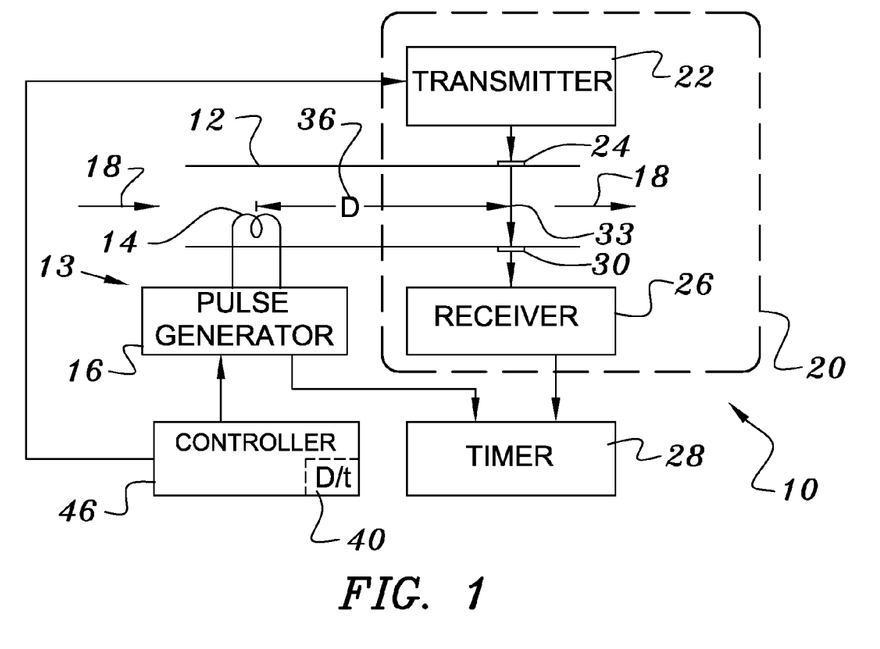
FIG. 1 is a schematic depiction of a simplified cross section of a flow meter of the present invention using a resistance heater and a single receiver transducer.

Turning now to FIG. 1 one finds a schematic depiction of a preferred embodiment of the flow meter of the invention 10. Arrows 18 show the direction of flow of the fluid 36 in a pipe 12. A thermal pulse input means 13, which in this embodiment comprises a resistive heater 14, is disposed upstream of transmitting 24 and receiving 30 transducers that define an acoustic beam 33 transverse to the flow direction 18. The heater 14 is electrically insulated from the pipe 12 if the pipe is electrically conductive, and is energized by a pulse generator 16 that also supplies a bolus-generation time output to a timer 28. The acoustic portion 20 of the apparatus comprises a transmitting transducer 24, energized by a transmitter 22, and a receiving transducer 30 that supplies an output to a receiver 26 that, in turn, supplies a bolus-detection time output to the timer 28.

In operation of the apparatus of FIG. 1, the pulse generator 16 periodically energizes the heater 14, which heats a bolus of the fluid 36. The fluid movement 18 transports the bolus through the acoustic beam 33. Because the speed of sound in many liquids changes with temperature and the speed of sound is measurably different in the bolus than in the rest of the fluid, passage of the heated bolus through the acoustic beam momentarily affects the acoustic transmission. The receiver 26 provides a bolus detection signal output to the timer 28 responsive to the passage of the bolus of heated fluid. Suitable logic circuitry 40 is then used to divide the known value of the distance, shown as D, along the pipe axis between the heater and transducers by the time interval between the heater pulse output timing signal and the detection signal in order to directly compute the rate of fluid flow. As is known in the measurement arts, this calculation can be carried out in a general purpose microcontroller 46 that can also be used to control other functions of the apparatus 10.

Figure 6A:
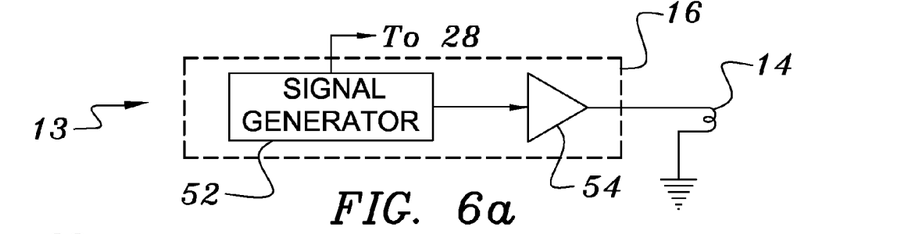
FIGS. 6a, 6b, 6c, 6d, and 6e are simplified electrical block diagrams of transducer driver and receiver circuits used with various embodiments of the invention.

Turning now to FIG. 6a, one finds a simplified schematic representation of the embodiment of the thermal pulse input means 13 shown in FIG. 1. In this case a pulse generator 16 comprises a signal generator 52, which provides a drive signal to a power amplifier 54, to both energize a resistive heater 14, and to provide to the timer 28 an output indicative of the time at which the bolus of fluid was heated.

Figure 2:
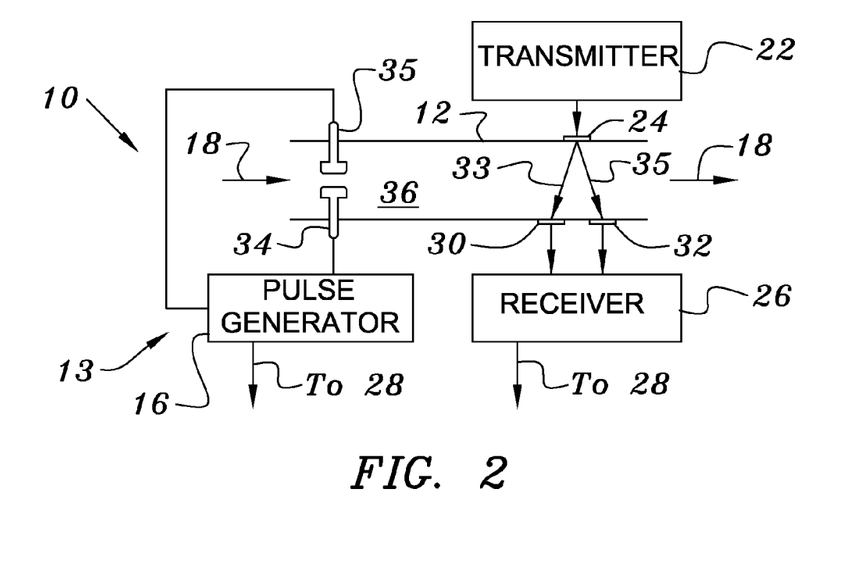
FIG. 2 is a schematic depiction of a simplified cross section of a flow meter of the present invention using heating electrodes and two receiver transducers.

FIG. 2 depicts another embodiment of the flow meter 10 of the invention in which the thermal pulse input means 13 comprises two electrodes 34, 35 that directly contact the fluid 36. In this case, the fluid must be sufficiently electrically conductive so that when an electrical pulse is provided from the pulse generator, enough power dissipation occurs in the vicinity between the electrodes to raise the temperature of that portion of the fluid an amount sufficient to enable it to be detected. This is not a difficult requirement to satisfy, for example where aqueous solutions using electrolyte additives for corrosion control are employed, as in circulating heating and cooling loops. For a 100 ohm electrode-to-electrode resistance through the fluid for example, a pulse voltage of 100 volts is required to dissipate 1 KW.

The pulse energizing the electrodes 34, 35 may be of a single polarity but is preferably bipolar to minimize electrode removal rate and polarization. A high frequency reversal of the polarity is desired to increase the dielectric losses of the fluid and thereby enable the necessary rise in fluid temperature to be achieved with a lower electrode voltage. The higher frequency also enables the transformer, if used at the output of the pulse generator, to be physically smaller. Because fluids can have a wide range of electrical conductivities and dielectric losses, some form of user or automatic power control is desirable to enable the minimum power requirement to be satisfied while avoiding excessive overpowering. Since the means for detecting the passage of the heated fluid is very tolerant however, this control is usually not a critical factor for a flow meter intended for a particular application.

Those skilled in the thermal dilution flow measurement arts will recognize that finite intervals are needed to both heat and cool a resistive heater 14 or other heating means. Moreover, both these heating time constraints and dilution of the bolus as it flows downstream generally provide some degree of uncertainty in the size and shape of the bolus. For example, a heater element that cools more slowly than it is heated can create a bolus with a tail. Hence, time offsets may have to be provided in the instrument to compensate for these minor distance uncertainties when calibrating the apparatus. Moreover, if flow rates are relatively low, diffusion and mixing effects may cause the bolus to widen enough to limit the accuracy of the measurement and may also require corrections.

Figure 7:
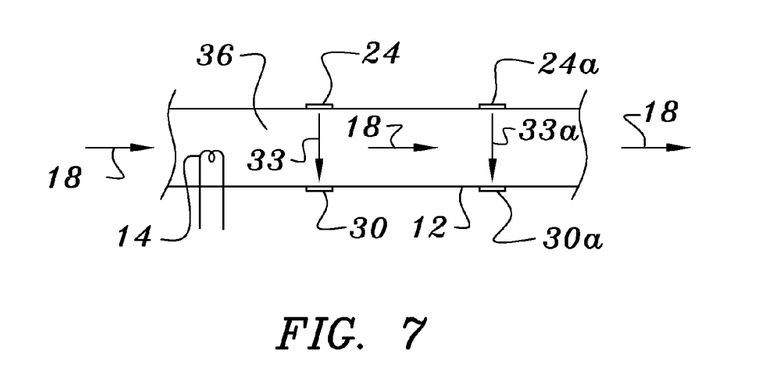
FIG. 7 is a schematic depiction of a cross-section of an embodiment of the invention employing multiple acoustic beams.

In another embodiment of the invention, schematically depicted in FIG. 7, relatively widely separated bolus detecting acoustic beams are spaced out along a pipe 12. In one arrangement, which may be useful for increasing the range of flow rates over which the flow meter can operate, low fluid flow rate signals are acquired at a detection location closer to the heating means—i.e., at the beam designated in FIG. 7 as 33 that extends between two transducers 24, 30—and high flow rate signals would be acquired at a second detection location further downstream, as indicated by the beam 33a in FIG. 7. For example, two bolus detection locations could be employed with two overlapping ranges so that the choice as to which detection signal is supplied to the timer could be performed automatically, in a seamless manner, by simple hardware logic circuitry. This logic could be referenced to a heating-to-detection interval corresponding to the center of the range overlaps. Alternately, one could operate the two spaced apart beam arrangement of FIG. 7 by spacing the two beams 33, 33a apart by a known distance, measuring a first time at which the bolus from the heater intersects the first beam 33, measuring a second time at which the bolus intersects the second beam 33a and then calculating the flow rate from the interval between the first and second times and the known distance between the beams.

If the thermal pulse input means 13 is a heating means energized to provide a high power input in a short pulse it may momentarily vaporize a portion of a flowing liquid. This rapid heat transfer can produce a bolus having a relatively small volume and a sharply defined shape. The length of such a bolus along the flow axis is small and its temperature rise large relative to a heating event where vaporization does not occur. Thus, ultrasonic detection of the bolus is accomplished more easily. When measuring the flow of water this sort of operation is readily obtained with a 0.200" long hairpin wire heater using 0.009" diameter wire and energized with 0.500 millisecond pulses at a power level of 1 KW. At these high power levels the heater operation produces a tapping or clicking sound each time it is energized. This sound pulse may be used in a feedback control system to regulate the magnitude of the energizing pulse applied to the heater and can also serve as an input to a diagnostic or operational monitor.

Those skilled in the art will recognize that there are many other ways of operating a thermal pulse input means to provide a fluid bolus characterized by a temperature that is either higher or lower than the rest of the fluid being measured. These include, but are not limited to, induction heating of a conducting fluid, optical heating (e.g., by means of a laser) of a transparent fluid, and injection of heated or cooled fluid from another source external to the pipe in which flow is being measured. Injecting a relatively cold bolus of fluid, such as a saline solution, is sometimes used in the medical arts relating to blood flow measurement.

Figure 6B:
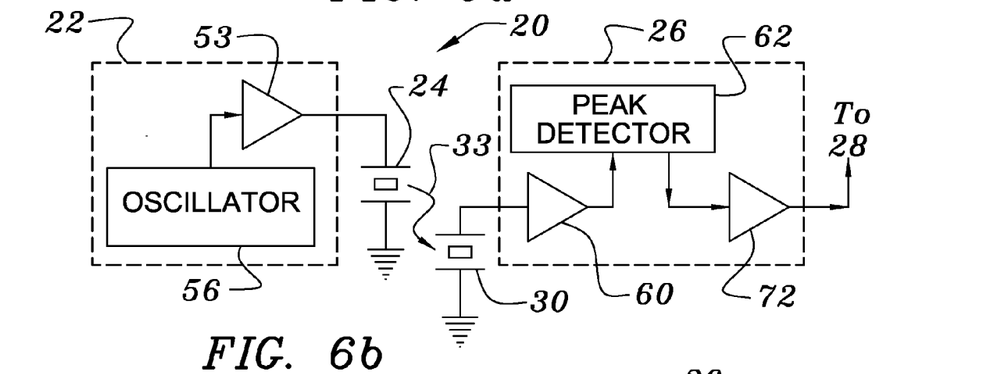

Turning now to FIG. 6b, one finds a schematic representation of the acoustic measurement portion 20 of the single-beam embodiment of the invention depicted in FIG. 1. The acoustic transmitter 22 contains an oscillator 56 for providing a signal to an amplifier 53, which energizes the transmitting transducer 24 and causes it to generate an acoustic signal in the flowing fluid. The receiver 26 contains an input amplifier 60 arranged to receive signals from the receiving transducer 30 and to output amplified signals to a peak detector 62, which provides its magnitude detected signal to an output amplifier 72 connected to the timer 28, for timing measurement. The output amplifier 72 may incorporate a high pass filter (not shown) to pass relatively fast changing signals corresponding to the passage of the heated fluid between the transducers. Those experienced in the art of ultrasonic transit time flow metering will realize that appropriate switches (not shown) can be added to the circuit of FIG. 6b to interchange the function of the receiving and transmitting transducers.

A representative flow meter having a rectangular fluid passage with cross-sectional dimensions of 0.315 inch by 0.200 inch, for example, has a heater-to-transducer spacing, D, along the flow axis of 0.7". A fast responding resistance type coil or hairpin-shaped heater made from a 0.009" diameter high resistivity wire and energized with one half a millisecond wide pulses is typical of the type of heater element employed. The peak power produced is on the order of 1 KW. These pulses typically occur every 1 to 10 seconds depending on the application. The average power level to the heater is thus in the range of 0.1 to 1 W.

In many preferred embodiments the acoustic portion 20 of apparatus of the invention may comprise separate transmitting and receiving transducers made from lead zirconate titanate having a length of 0.200", a width of 0.080", and a thickness of 0.020". In this arrangement the transmitter 22 typically provides a continuous 1 to 2 volt, 4 MHz drive signal to the transmitting transducer 24, which generates an acoustic beam. The beam is received by a receiving transducer 32 which passes a signal to a receiver 26 that amplifies that signal and detects variations associated with acoustic transmission changes due to the heated fluid intersecting that path. These variations may be detected as either signal magnitude or signal phase variations, as will be described in greater detail hereinafter.

FIG. 2 depicts another embodiment of the flow meter 10 of the invention. In this embodiment a second receiving transducer 32 is used. The receiving transducers are positioned close to each other and are preferably symmetrically disposed so as to equally sense acoustic transmissions from the transmitting transducer 24 along the two acoustic paths 33, 35. In this arrangement the signals from the receiving transducers 30, 32 are compared differentially either in magnitude or in phase. The signals from the two receiving transducers 30, 32 become identical when the bolus affects their acoustic paths equally. This generally happens when the bolus is located midway between the receiving transducers, just before it exits the acoustic portion of the flow meter. An output signal to the timer 28 produced at that instant is used to compute the flow rate. This timing signal is measured most precisely when the effective width of the bolus does not exceed the distance between the upstream edge of the upstream receiving transducer 30 and the downstream edge of the downstream receiving transducer 32.

Figure 6C:
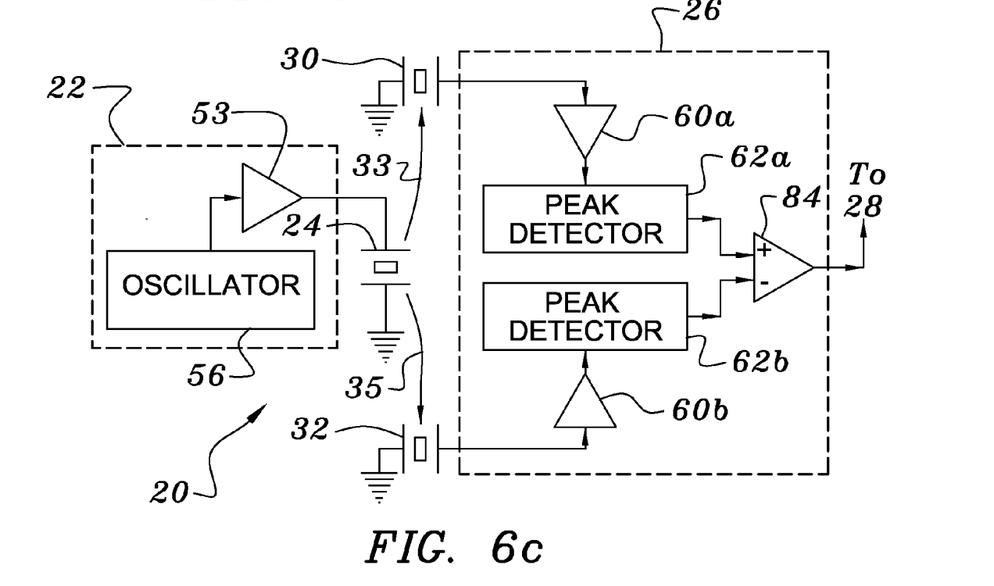

A simplified electrical block diagram for magnitude detection in an embodiment using two receiving transducers is shown in FIG. 6c. Signals from a first receiving transducer 30 are supplied to a first signal input amplifier 60a, processed through a first peak detector 62a and then input to a differential amplifier 84. Signals from the second receiving transducer 32 are similarly processed by a second input amplifier 60b and a second peak detector 62b to supply a second input to the differential amplifier 84, which then provides the difference signal to the timer 28. The peak detectors, responding to the magnitude of their input signals, enable the differential amplifier to produce a relatively large output signal from small differences in the levels of its input signals.

Figure 6D:
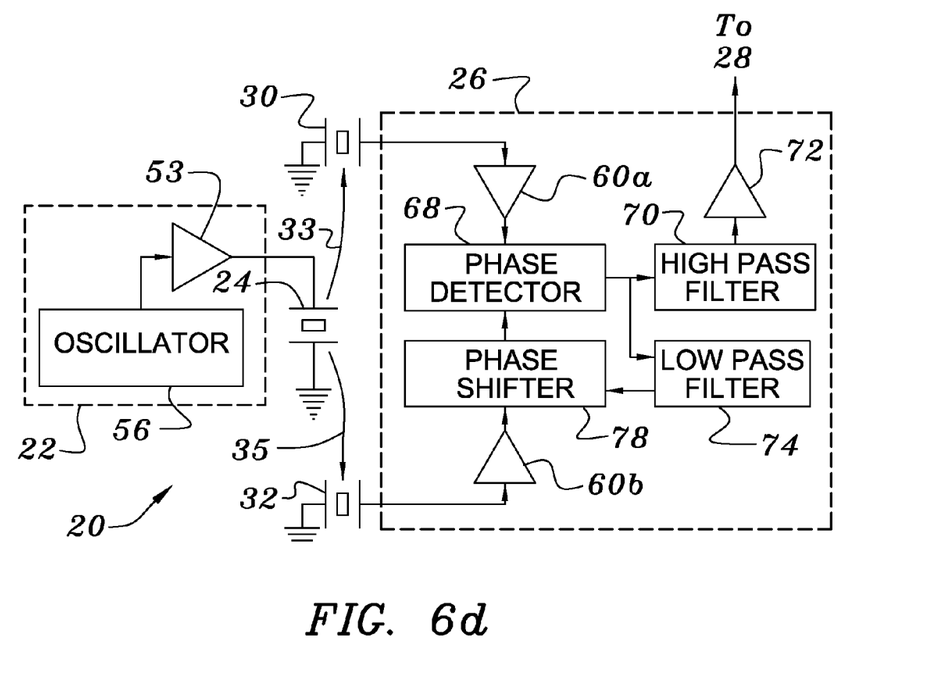

A simplified electrical block diagram for phase detection is shown in FIG. 6d. In this embodiment signals received by the first receiving transducer 30 are amplified by a first signal amplifier 60a and input to a phase detector 68. Signals from the second receiving transducer 32 are amplified in the second input amplifier 60b. The output from the second input amplifier is passed through a phase shifter 78 and thence to the phase detector 68. An output from the phase detector 68 signal passes through a low pass filter 74 to supply a control input to the phase shifter 78. This arrangement is used to control the phase of the signal from the transducer 32 reaching the phase detector so that its average output signal remains constant. Relatively fast changing signals, typical of those due to the heated fluid intersecting the acoustic path between the transducers, are passed through the high pass filter 70 to an output amplifier 72, and then to the timer 28 for timing measurement.

The acoustic path variations due to the bolus passage may also be detected as phase perturbations when using a single receiving transducer. A phase locked loop may be employed with a long time constant filter to phase shift the transmitted signal entering the phase detector. This can maintain long term stability while being very sensitive to relatively fast phase changes, typical of those due to the bolus intersecting the acoustic path between the transducers. An arrangement of this sort could be provided, for example, by modifying the circuit of FIG. 6d so as to supply an input signal to the amplifier 60b from the oscillator 56, rather than from the transducer 32, which is not used.

Although the foregoing description of the acoustic portion 20 of the apparatus 10 refers to the acoustic beam(s) 33, 35 as being straight lines extending directly from a transmitting to a receiving transducer, it should be realized that one could also employ a multi-segmented path in which each beam is reflected one or more times from an internal surface of the pipe 12 or from a separate reflector. As is known in the art of making transit time flow meters, this sort of arrangement can provide a longer sensing path and may be of interest when it is desired to have both the receiving and transmitting elements on the same side of the pipe or other flow channel.

Figure 6E:
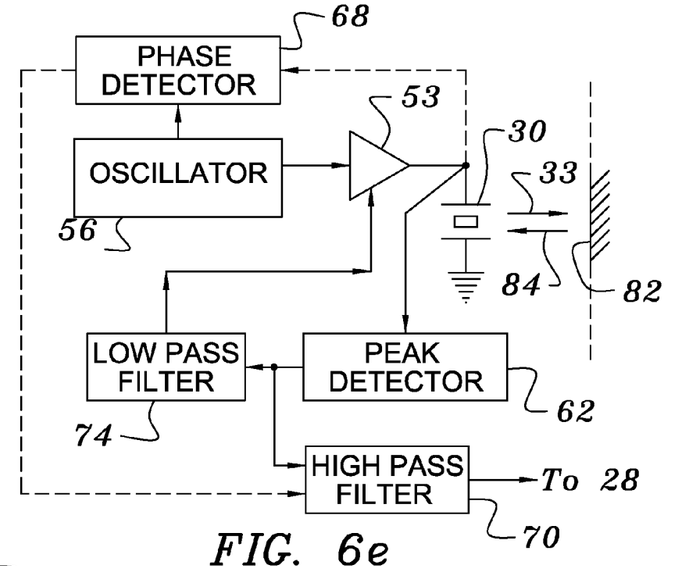

In other arrangements, as schematically depicted in FIG. 6e, a single transducer 30 and an acoustically reflective surface 82 on the other side of the flow passage may be used to define the acoustic beam. Using a single transducer for both the transmitting and receiving functions is commonly done in acoustic depth sounders. In this 'quasi-depth-sounder' the rapid variation in the apparent distance between the transmitter and the reflector, caused by the bolus intersecting the acoustic transmitted 33 and reflected beams 84 is used to determine the time interval. In this case, the cyclic rate of the sounding pulses must be rapid enough to adequately sample acoustic variations over the range of flow rates experienced, or a form of continuous transmission must be used. A similar reflective arrangement can use a pair of transducers, where each one defines its own reflective path, to provide differential signals so that a detection signal is produced when the bolus is located between the transducers. The transducers can also exchange receiving and transmitting functions.

A form of continuous transmission with a single transducer is illustrated in the simplified electrical block diagram of FIG. 6e. In this case, an oscillator 56, provides a signal to an amplifier 53, which connects to a transducer 30. The transducer 30 beams acoustic energy along an acoustic path 33 to a reflector 82, which returns a portion of that energy along another path 84 to the transducer. The output signal from the amplifier 53 is supplied to the peak detector 62 which has an output to the low pass filter which, in turn, provides outputs to the amplifier 53 and to the high pass output filter 70, and ultimately to the timer 28.

During operation of the circuit depicted in FIG. 6e the amplifier 53 amplifies the oscillator 56 signal and applies it to the transducer 30. The peak detector 62 detects the magnitude of the signal from the amplifier 53 and passes the corresponding signal through the low pass filter 74 back to the amplifier 53 in a manner typical of a negative feedback control loop. This controls the magnitude of the amplifier output to be less than its maximum so that it can momentarily increase or decrease without exhibiting serious distortion. The amplifier 53 is selected to have a high output impedance relative to the transducer. When the reflected acoustic energy along the path 84 is received by the transducer and converted into an electrical signal, that signal combines with the signal produced by the amplifier 53 and is detected by the peak detector 62 to operate the feedback control loop. When the energy level along the path 84 is changed relatively quickly, as is characteristic of a bolus passing through the beam, the feedback loop cannot respond fast enough to maintain the signal magnitude supplied the peak detector constant. Hence, the signal magnitude changes, and after passing through the high pass filter 70, the signal emerges as a detection signal of bolus passage.

If a phase detector 68, is connected as indicated by the broken lines in FIG. 6e to compare the phase of the amplifier output and the oscillator signal, a phase detection signal is provided. When passed through the high pass filter 70 this may also be used as a detection signal of bolus passage.

Figure 6F:
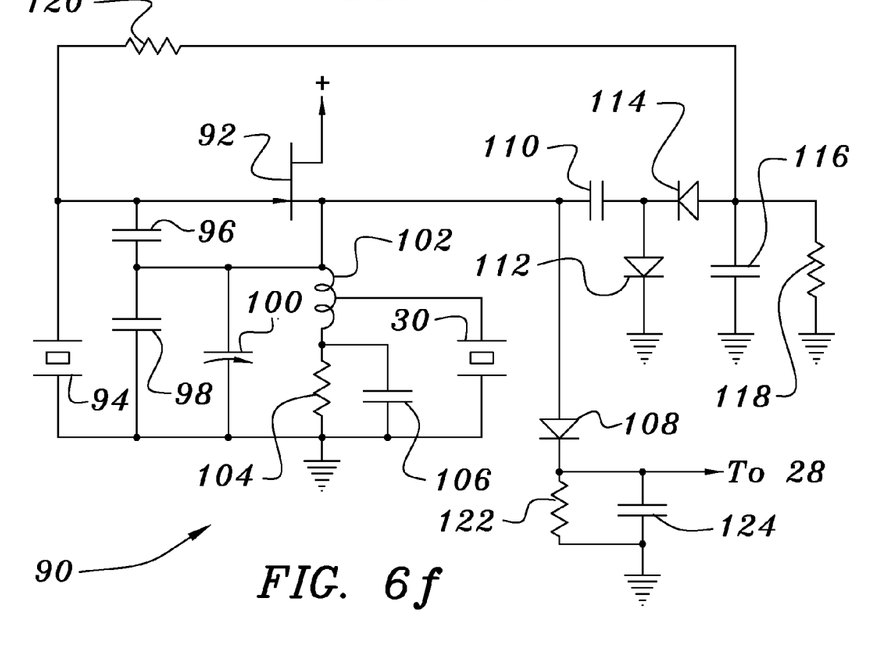
FIG. 6f is a simplified block diagram of an oscillator circuit used with some embodiments of the invention.

A relatively simple oscillator circuit 90, as illustrated in FIG. 6f may be configured to provide an amplitude detected signal of the bolus passage for use with a single transducer. In this circuit a FET 92 serves as an amplifier connected to both a frequency controlling resonator 94 and to oscillatory feedback capacitors 96, 98. A tuning capacitor 100 is used to tune the inductor 102 for optimum signal transfer to the transducer 30. A resistor 104 and capacitor 106 provide DC startup bias. The AC output signal from the transistor 92 source passes through the capacitor 110 to a pair of rectifiers 112, 114. After rectification the signal is supplied to a capacitor 116 and to a pair of resistors 118 and 120 which connect to the gate of the transistor 92 to complete the gain control feedback loop.

During the oscillatory operation of the circuit of FIG. 6f, the rectified signal from the transistor 92 source passes through a long time constant filter consisting of capacitor 116 and resistor 118 prior to passing through another resistor 120 to the transistor gate. This is done to control the gain of the transistor 92 so that its operation is generally linear and well within its maximum operating range and operates very slowly. The signal can thus momentarily change in value without causing the transistor to become seriously nonlinear. When a relatively fast signal change is introduced to the oscillator, the regenerative nature of the oscillator causes it to respond in an exaggerated way, providing high detection sensitivity. This fast response signal, corresponding to bolus detection, is rectified by a diode 108 and carrier filtered by a resistor 122 and capacitor 124 to provide the detection signal to the timer 28. The mechanism of incorporating an amplifier with signal regeneration and also regulating the gain of an amplifier very slowly to control regeneration of the signal by the amplifier so that relatively fast changes in the signal are exaggerated in the output to timer 28, is generally applicable to all of the approaches herein described for deriving the detected signal.

Figure 3:
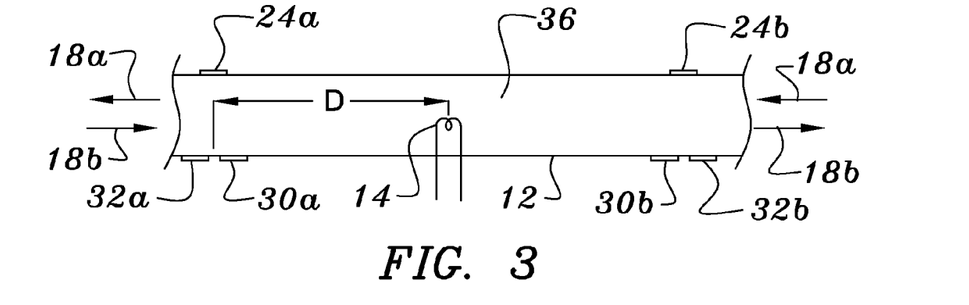
FIG. 3 is a depiction of a simplified cross section of a portion of the present invention for measuring flow rate in both directions through a single passage.

FIG. 3 depicts an embodiment having a single heater 14 centrally located in a pipe 12 between two sets of transmitting and receiving transducers 24a, 30a, 32a; 24b, 30b, and 32b. This arrangement can be used to sense the flow rate of fluid 36 in either direction, as indicated by arrows 18a or 18b. Those skilled in the art will appreciate that one could equally well configure a bidirectional flow measurement by providing a single, centrally located, set of transducers and two heaters spaced apart in either direction from the transducer sets. Moreover, a bidirectional instrument could be configured having both two heaters and two acoustic portions. An arrangement of this sort, for example, could be used in a flow probe configuration having two parallel, but separated flow measurement channels, one operable in one of the two possible directions of flow of fluid within a pipe and the other operable in the other direction.

Figure 4:
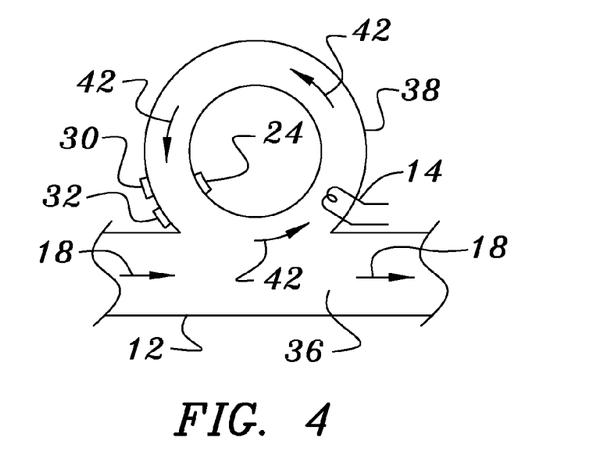
FIG. 4 is a depiction of a simplified cross section of a portion of the present invention for measuring flow rate in a confined space.

FIG. 4 depicts another embodiment in which the flow meter pipe 12 has a bypass flow loop 38 attached to it so that a portion 42, of the fluid 36 circulates in the loop. A heater 14 and a set of transducers 24, 30, and 32 are provided in the loop to measure the fluid flow rate in the loop and to derive from that measurement the fluid flow rate through the pipe.

Figure 5:
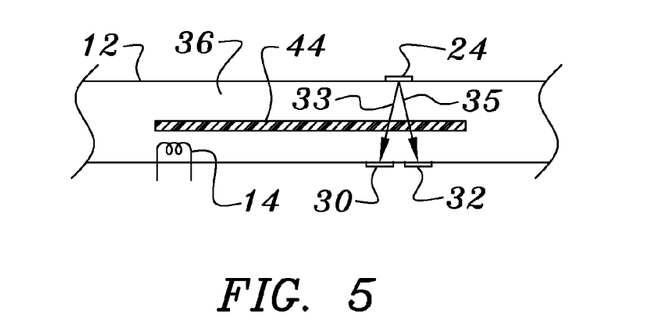
FIG. 5 is a schematic cross-sectional depiction of the use of a vane to control flow of a heated bolus.

FIG. 5 depicts an embodiment of the invention in which one or more vanes 44 is used to separate the flowing fluid so that only a portion of the fluid needs to be heated and directed to pass close to the receiving transducer(s). This arrangement reduces the power required for the heater and improves detection sensitivity at the expense of some increase in pressure drop through the meter and in increased error due to changes in flow profile over a range of flow rates. In a particular case, depicted in FIG. 5, an acoustically transparent plastic vane 44 was used and both ultrasonic beams 33, 35 passed through the vane.

Apparatus of the invention comprising both two receiving transducers spaced apart along a pipe 12 and phase-sensitive electronics can provide two separate modes of flow measurement. For relatively low flow rates the apparatus can operate as a thermal pulsed flow meter in which a heated bolus is formed or injected and subsequently acoustically detected at a downstream location, as disclosed hereinbefore. At relatively higher flow rates, for example, the acoustic portion 20 can operate as a transit time ultrasonic flow meter without requiring thermal injection. The phase sensing electronics of FIG. 6*d*, for example, could be used in this mode as long as the phase shifter 78 is linear. If a more common non-linear phase shifter is used, additional circuitry could be added to effectively remove the phase shifter or to set it so as to induce a constant or zero phase shift. The magnitude of the output signal from the phase detector would then be indicative of the phase and, if that phase detector is linear, as is typical of Exclusive-OR or SR Flip Flop circuits, will be proportional to the flow rate.

Although the present invention has been described with respect to several embodiments, many modifications and alterations can be made without departing from the invention. Accordingly, it is that such modifications and alterations be considered as within the spirit and scope of the invention as defined in the attached claims.

The invention claimed is:

1. A flow meter for measuring the rate of flow of a fluid characterized by an acoustic property that varies with temperature, the flow meter comprising:
   a thermal input means, operable when the fluid is flowing along a flow direction, to provide a bolus of the fluid at a first selected location, the bolus having a temperature different from the rest of the fluid so that the acoustic property of the bolus is different from the acoustic property of the rest of the fluid, the thermal input means further operable to provide a thermal pulse timing signal to a logic circuit for calculating the flow rate; and
   at least one acoustic portion, each comprising at least one respective ultrasonic transducer and a respective receiver circuit, each acoustic portion operable, when the fluid is flowing:
      to define at least one respective acoustic beam extending transverse to the flow direction at a respective selected location downstream from the first selected location; and
      to output from the respective receiver circuit a bolus detection signal responsive to the difference in the acoustic property associated with passage of the bolus to the logic circuit.

2. The flow meter of claim 1 wherein the thermal input means comprises a resistive heater.

3. The flow meter of claim 1 wherein the fluid is electrically conductive and the thermal input means comprises two electrodes immersible in the fluid.

4. The flow meter of claim 1 wherein the acoustic portion comprises a single transducer and a reflector.

5. The flow meter of claim 1 wherein the acoustic portion comprises a single transmitting transducer and a single receiving transducer defining a single acoustic beam and wherein the circuit is operable to calculate the flow rate of the fluid from a distance along the flow direction between the first location and the acoustic beam and from a measured time interval between the thermal pulse timing signal and the bolus detection signal.

6. The flow meter of claim 1 wherein the acoustic portion comprises a transmitting transducer and two receiving transducers disposed side by side along the flow direction, each of the receiving transducers defining, with the transmitting transducer, a respective acoustic beam; and wherein the circuit is operable to calculate the flow rate of the fluid from a distance between the first location and a point midway between the two side by side receiving transducers.

7. The flow meter of claim 1 wherein the acoustic portion comprises at least two transmitting transducers spaced apart along the flow direction, each having at least one receiving transducer associated therewith, and wherein the circuit is operable to calculate the flow rate of the fluid from one of:
   a) a distance between the first location and a first of the spaced apart beams and a measured time interval between the thermal pulse timing signal and the bolus detection signal associated with the first of the spaced apart beams; and
   b) a distance between the first location and the second of the spaced apart beams and a measured time interval between the thermal pulse timing signal and the bolus detection signal associated with the second of the spaced apart beams.

8. The flow meter of claim 1 wherein the acoustic portion comprises at least two transmitting transducers spaced apart along the flow direction, each having at least one receiving transducer associated therewith, and wherein the circuit is operable to calculate the flow rate of the fluid from a distance between the first and second spaced apart beams and a measured time interval between the respective bolus detection signals associated with each of the beams.

9. The flow meter of claim 1 wherein the receiver circuit is responsive to a phase of the acoustic beam.

10. The flow meter of claim 1 wherein the receiver circuit is responsive to a magnitude of the acoustic beam.

11. The flow meter of claim 1 further comprising a vane disposed along the flow direction for separating the flowing fluid into a first portion in which the bolus is formed at the first time and in which the bolus intersects the acoustic beam at the second time; and a second portion that does not contain the bolus.

12. A method of measuring a rate of flow of a fluid along a flow direction, the fluid characterized by an acoustic property that varies with temperature, the method comprising the steps of:
   a) providing a fluid bolus having a temperature different from that of the rest of the fluid at a first location and a first time so as to change the acoustic property of the fluid in the bolus;
   b) providing at least one acoustic beam transverse to the flow direction at a respective selected distance downstream from the first location;
   c) conveying the bolus, by means of the flowing fluid, through each acoustic beam;
   d) determining, by means of circuitry responsive to the changed acoustic property of the fluid in the bolus, a respective time at which the bolus intersects the respective acoustic beam;
   e) calculating the rate of flow from one of:
   i) a distance between the first location and one of the acoustic beams and a measured time interval between the first time and the respective time at which the bolus intersects the respective beam, and
   ii) a distance between two of the beams and a measured interval between the respective times at which the bolus intersects each of the two of the beams.

13. The method of claim 12 wherein the circuitry is responsive to changes in the magnitude of signals output from a receiving transducer receiving the acoustic beam.

14. The method of claim 12 wherein the circuitry is responsive to changes in a phase of signals output from a receiving transducer receiving the acoustic beam.

15. The method of claim 12 wherein, in step b) two acoustic beams are provided transverse to the flow direction by means of a single transmitting transducer and two receiving transducers are disposed side by side along the flow direction and wherein the selected distance comprises a distance between the first location and a midpoint, measured along the flow direction, between the two receiving transducers.

16. The method of claim 15 wherein the circuitry responsive to the changed acoustic property operates on phases of respective signals received by the two receiving transducers, the method further comprising a step of analyzing differences in the phases to provide a second determination of the flow rate.

17. The method of claim 12 wherein the acoustic beam is provided by means of at least one ultrasonic transducer.

18. The method of claim 12 wherein the step of providing the fluid bolus comprises supplying a heat input for vaporizing a portion of the fluid.

19. The method of claim 12 wherein the step of providing the fluid bolus comprises injecting fluid from a source other than the flowing fluid.

20. The method of claim 12 wherein the acoustic property comprises the speed of sound in the fluid.

* * * * *